(12) United States Patent  
Narayanan et al.

(10) Patent No.: US 9,152,478 B2
(45) Date of Patent: *Oct. 6, 2015

(54) REAL-TIME COMMUNICATIONS CLIENT ARCHITECTURE

(71) Applicant: Ecrio, Inc., Cupertino, CA (US)

(72) Inventors: Krishnakumar Narayanan, Pleasanton, CA (US); Michel E. Gannage, Los Altos Hills, CA (US)

(73) Assignee: ECRIO, INC., Cupertino, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/108,262

(22) Filed: Dec. 16, 2013

(65) Prior Publication Data

US 2014/0109108 A1    Apr. 17, 2014

Related U.S. Application Data

(63) Continuation of application No. 13/527,571, filed on Jun. 19, 2012, now Pat. No. 8,639,253.

(51) Int. Cl.
*H04W 52/02* (2009.01)
*G06F 9/54* (2006.01)

(52) U.S. Cl.
CPC .............. *G06F 9/54* (2013.01); *H04W 52/028* (2013.01); *Y02B 60/50* (2013.01)

(58) Field of Classification Search
CPC combination set(s) only.
See application file for complete search history.

(56) References Cited

U.S. PATENT DOCUMENTS 8,260,966 B2   9/2012  Shatsky et al.
8,639,253 B2   1/2014  Narayanan et al.
2005/0141694 A1   6/2005  Wengrovitz
2006/0155814 A1   7/2006  Bennett et al.
2007/0177606 A1*  8/2007  Jabri et al. ................. 370/395.5
2007/0180135 A1*  8/2007  Kenrick et al. ............... 709/231

(Continued)

OTHER PUBLICATIONS

Nvidia Corporation. Variable SMP (4-PLUS-1 TM)—A Multi-Core CPU Architecture for Low Power and High Performance (Whitepaper), 2011 [online] [retrived on Oct. 23, 2013]. Retrieved from the Internet <www.nvidia.fr/content/PDF/tegra_white_papers/Variable-SMP-A-Multi-Core-CPU-Architecture-for-Low-Power-and-High-Power-Performance.pdf>. 17 Pages.

(Continued)

*Primary Examiner* — Diane Mizrahi
(74) *Attorney, Agent, or Firm* — David H. Carroll

(57) ABSTRACT

A distributed services modular client architecture may be used to implement IP-based real time communication services in a flexible manner among a wide variety of different types of chip sets and systems-on-chip. The various services are distributed among one or more processor cores, at least one of which is a low power core, in accordance with a number of factors, including power consumption, media latency, on-time, performance, and other considerations. A processor "core" may refer to a processor itself where the processor has only a single core, and may also refer to a "core" of a multicore processor. The architecture uses a SIP/IMS framework, and is modularized by placing certain services into their own framework so that a particular service may be plugged into the SIP/IMS framework if and when desired, and otherwise omitted. The frameworks may be installed on various processor cores within the chip set or system-on-chip, including in particular the low power core, to allow for more effective power conservation without unduly sacrificing performance.

22 Claims, 10 Drawing Sheets

(56) References Cited

U.S. PATENT DOCUMENTS

| | | | |
|---|---|---|---|
| 2007/0294336 A1 | 12/2007 | Pounds et al. | |
| 2008/0235778 A1 | 9/2008 | Fratti et al. | |
| 2009/0141654 A1 | 6/2009 | Voutilainen et al. | |
| 2009/0222842 A1 | 9/2009 | Narayanan et al. | |
| 2010/0169483 A1 | 7/2010 | Jalkanen | |
| 2010/0257539 A1 | 10/2010 | Narayanan et al. | |
| 2012/0225652 A1 | 9/2012 | Martinez et al. | |
| 2012/0231787 A1 | 9/2012 | Conner et al. | |
| 2012/0246322 A1 | 9/2012 | Patil et al. | |
| 2012/0281621 A1 | 11/2012 | Lotfallah et al. | |
| 2012/0307721 A1 | 12/2012 | Jong et al. | |
| 2012/0309294 A1 | 12/2012 | Jong et al. | |
| 2013/0006602 A1* | 1/2013 | Zhu et al. ................. | 704/2 |
| 2013/0028175 A1 | 1/2013 | Jong et al. | |
| 2013/0064106 A1 | 3/2013 | Sylvain | |
| 2013/0337864 A1* | 12/2013 | Narayanan et al. ........ | 455/552.1 |
| 2014/0348044 A1 | 11/2014 | Narayanan et al. | |

OTHER PUBLICATIONS

3rd Generation Partnership Project 2 "3GPP2". Short Message Service over IMS, 3GPP2 X.S0048-0, Version v1.0, Nov. 2007 [online] [retrieved on Oct. 23, 2013]. 54 Pages. Retrieved from the Internet: <http://www.3gpp2.org/public_html/specs/X.S0048-0_v1.0-071111.pdf.X.S0048-0>.

International Searching Authority / FIPS. International Search Report: International Patent Application No. PCT/US2013/046437, Oct. 2, 2013. 2 pages.

International Searching Authority / FIPS. Notification of Transmittal of the International Search Report and the Written Opinion of the International Searching Authority, or the Declaration: International Patent Application No. PCT/US2013/046437, Oct. 2, 2013, 1 Page.

International Searching Authority / FIPS. Written Opinion of the International Searching Authority: International Patent Application No. PCT/US2013/046437, Oct. 2, 2013. 4 Pages.

Nokia Solutions and Networks. Rich Communication Suite Initiative, Feb. 7, 2008 [online] [retrieved on Oct. 23, 2013]. 4 Pages. Retrieved from the Internet: <nsn.com/news-events/press-releases/rich-communication-suite-initiative>.

Google Inc. WebRTC Demo [online], 2011-2012 [retrieved on May 21, 2013]. Retrieved from the Internet: <URL http://www.webrtc.org/demo>. 1 Page.

Google Inc. WebRTC General Overview [online], 2011-2012 [retrieved on May 21, 2013]. Retrieved from the Internet: <URL:http://www.webrtc.org/reference/architecture>. 3 Pages.

International Searching Authority / RU: FIPS. International Search Report: International Patent Application No. PCT/US2014/039037, Sep. 4, 2014. 2 Pages.

International Searching Authority / RU: FIPS. Notification of Transmittal of the International Search Report and the Written Opinion of the International Searching Authority, or the Declaration: International Patent Application No. PCT/US2014/039037, Sep. 4, 2014. 1 Page.

International Searching Authority / RU: FIPS. Written Opinion of the International Searching Authority: International Patent Application No. PCT/US2014/039037, Sep. 4, 2014. 4 Pages.

Narayanan, Krishnakumar et al. Reply to Non-Final Office Action Under 37 C.F.R. 1.111, U.S. Appl. No. 14/284,136, Apr. 3, 2015. 18 Pages.

United States Patent and Trademark Office. Office Action: U.S. Appl. No. 14/284,136, Dec. 3, 2014. 40 Pages.

* cited by examiner

REAL-TIME COMMUNICATIONS CLIENT ARCHITECTURE

CROSS-REFERENCE TO RELATED APPLICATIONS

This application is a continuation of U.S. patent application Ser. No. 13/527,571, filed Jun. 19, 2012, which hereby is incorporated herein in its entirety by reference thereto.

BACKGROUND OF THE INVENTION

1. Field of the Invention

This invention relates generally to communications methods and devices, and more particularly to a real-time communications client architecture for various Internet Protocol networks such as 4G/LTE, Wi-Fi, WiMAX and 3G networks.

2. Description of the Related Art

Many different types of digital electronic devices require a communications capability. The number and type of devices has grown dramatically, and each device category, manufacturer, and service may have a wide range of device platforms and operating systems, and multiple application environments, and are required to interoperate across many networks and systems. Since applications typically are device and service specific, this has limited the availability and use of new functions and capabilities to selected devices. The time and investment required to implement a new capability across an entire, complex device portfolio continues to increase as the range and type of devices increases. Developers, device suppliers, and service providers need a better means to support many device types and models with lower incremental time, cost, and risk to fully utilize investments and to offer services and value to more customers and markets.

Long Term Evolution ("LTE") is a relatively recent standard developed by the Third Generation Partnership Project ("3GPP") for wireless communication of high speed data for mobile phones and data terminals. Voice over LTE ("VoLTE") has become the preferred industry choice for providing voice services over LTE. However, implementation of LTE on digital electronic devices has been hindered by power consumption issues and, in the case of VoLTE, long implementation lead times.

BRIEF SUMMARY OF THE INVENTION

One embodiment of the present invention is a real-time communications client architecture for a chip set or a system-on-chip having a plurality of processor cores disposed therein, at least one of the processor cores being a communication processor, comprising: a modular SIP/IMS framework installed on a first one of the processor cores; and at least one modular framework for a real-time communications service installed on a second one of the processor cores and in communication with the modular SIP/IMS framework.

Another embodiment of the present invention is a real-time communications client architecture for a chip set or a system-on-chip having a plurality of processor cores disposed therein, at least one of the processor cores being a IP communication processor, comprising: a modular SIP/IMS framework; a modular VoIP framework; a modular video framework; a modular RCS framework; and a modular SMS over IMS framework; the modular SIP/IMS framework, the modular VoIP framework, the modular video framework, the modular RCS framework, and the modular SMS over IMS framework being distributed across the processor cores in accordance with media latency, quality of service, and power requirement considerations, and operatively in communication with one another.

DETAILED DESCRIPTION OF THE INVENTION, INCLUDING THE BEST MODE

Figure 1:
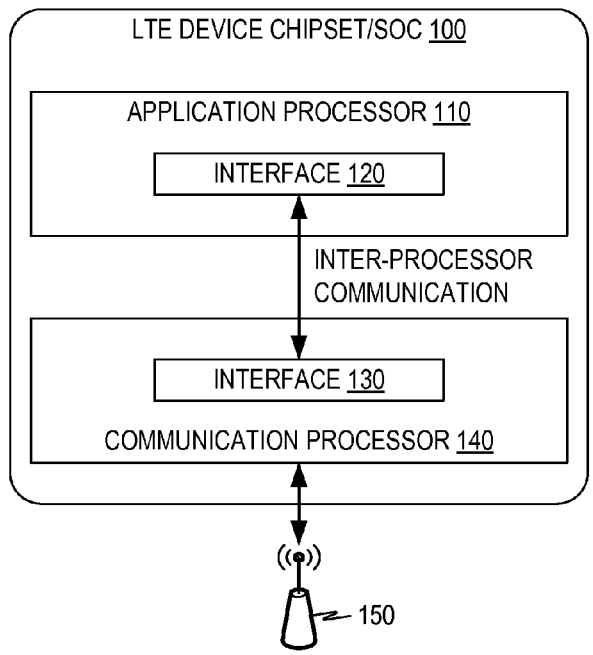
FIG. 1 is a schematic diagram of a LTE device chipset or SoC device.

Real-time communications over various Internet Protocol ("IP") networks such as 4G/LTE, Wi-Fi, WiMAX and 3G is desirable for many different types of mobile digital devices, including, for example, smartphones, feature phones, tablets, and ultrabooks and other laptops. Such real-time communications may be implemented using multiple-processor chip sets or systems-on-chip. FIG. 1 shows an illustrative chip set/System-on-Chip ("SoC") 100 which includes a communication processor 140, illustratively a modem/baseband processor, for example, for handling network operations, and an application processor 110 for running various user applications. Implemented with limited functionality, the communication processor 140 may have lower power consumption than the application processor 110. An interface 120 in the application processor 110 and an interface 130 in the communication processor 140 facilitate inter-processor communication.

Chip sets and systems-on-chip suitable for communications via IP networks, including, for example, 4G/LTE, Wi-Fi, WiMAX and 3G, are quite varied. The relative processing power and power consumption of the application processor 110, or of its cores if a multicore processor, and the communication processor 140 may vary substantially from chip set to chip set, as may the particular implementations of the application processor 110 and the communication processor 140. The application processor 110, for example, may be single core or multi-core (dual core or quad core, for example). If multi-core, the various cores may be optimized for different purposes; for example, low latency, high quality of service, and low power consumption through either low power dissipation or aggressive power management. A given chip set may have one communication processor suitable for several communications protocols, or multiple simple communication processors each specializing in a particular communications protocol.

While custom real-time communications client architectures may be developed for such chip sets, we have found that a distributed services modular client architecture may be used to implement IP-based real time communication services, including VoLTE, video calling, and companion rich communications services, in a flexible manner among a wide variety of different types of chip sets and systems-on-chip. In such a client architecture, the various services, which may also be referred to as functions, are distributed among two or more processor cores in accordance with a number of factors, including power requirements, media latency, quality of service, and any other considerations as may be desired. The term "processor core" may, for example, refer to a single core processor as well as a core of a multicore processor. One or more of the cores in a multicore processor may be a low power core, which also is referred to as a battery saver core. The client architecture uses a modular SIP/IMS framework with other other services being placed into their own modular frameworks as well, so that a particular service framework may be plugged into the SIP/IMS framework if and when desired, and otherwise omitted. The frameworks may be installed on various processor cores within the chip set or system-on-chip based on their power demands and profiles, media latency constraints, and quality of service constraints.

As used herein, the term "real time communications" refers to communications having a latency generally within acceptable norms for the communications application in question, in that any perceptible delay between the sender and the receiver are minimal and tolerated. In the case of VoIP, for example, the latency generally should not exceed about 150 ms.

As used herein, the term "device platform environment" refers to hardware, operating system, frameworks, and combinations thereof created for a device platform.

As used herein, the term "rich communication" refers to various communications service capabilities including, but not limited to: (a) voice calling, including standard voice, Voice over IP calling over IMS, and Voice over LTE; (b) Short Message Service ("SMS") over IP Messaging over IMS; (c) packet switched video telephony including two-way video calling; (d) situation awareness, including real-time presence, capabilities, and location for contacts; (e) enhanced messaging, including both standard and advanced IP messaging including conversational messaging; and (f) sharing, including real-time, person-to-person video, image, and file sharing.

As used herein, the term "framework" refers to a collection of one or more software components such as application logic controllers ("ALC"), engines, enablers, and protocol stacks for carrying out one or more functions. A framework may but need not contain all of the components needed for carrying out its function, provided it has access to the absent components. Components such as engines and enablers, for example, may be provided outside of the framework through extensions so that they may be shared, or direct function calls from an ALC without sharing.

As used herein, the term "communication processor" or "CP" refers to a chip or part of a chip that manages various radio functions in a network interface. Such a processor may include its own memory such as, for example, random access memory, and may use its own operating system, typically a simple real time operating system ("RTOS") written in firmware. Suitable operating systems include, for example, the Real-Time Executive ("REX") operating system available from Qualcomm Incorporated of San Diego, Calif., USA, and the Nucleus operating system available from Mentor Graphics Corporation of Wilsonville, Oreg., USA. While software may be installed on a communication processor in any manner desired, including random access memory ("RAM"), Flash, and other types of memory, a particularly advantageous manner of installation when low power operation is desired is to embed the software as read-only memory ("ROM") during the manufacturing process.

As used herein, the term "application processor" or "AP" refers to a chip or part of a chip that runs various user and manufacturer applications under relatively powerful and sophisticated operating systems. Such a processor may include its own memory. In the case of mobile phones, for example, suitable application processor architectures include the Advanced RISC Machine ("ARM") architecture and various architectures available from Intel Corporation of Santa Clara, Calif., USA. Suitable operating systems include, for example, the Android and Linux operating systems which are available from various companies, the Windows(®) operating system available from Microsoft Corporation of Redmond, Wash., USA, and the iOS operating system available from Apple Inc. of Cupertino, Calif., USA.

As used herein, the term "chipset" refers to a group of integrated circuit chips that are designed to function together and are usually marketed as a single product. The chips themselves may be separately packaged, or packaged together in a unifying substrate for use as a single component, as in the case of a multi-chip module, for example. Communication between the application processor and communication processor may be through respective fast interfaces which are usually dependent on the chipset manufacturer.

As used herein, the term "System-on-Chip" or SoC refers to a chip which contains various different types of circuits. In the case of mobile phones, for example, a SoC may integrate an ARM microprocessor core along with a communication processor, a graphical processing unit, and random access memory. Communication between the application processor and communication processor may be through respective fast interfaces which are usually dependent on the SoC manufacturer.

As used herein, the term "multicore processor" refers to a single computing component having two or more essentially independent processors, or cores, for the reading and execution of program instructions. Many options striking various balances between power requirements and performance characteristics are available. ARM Ltd. of Cambridge, UK, offers big.LITTLE processing using the performance ability of the ARM CORTEX-A15 MPCORE(™) processor with the energy efficiency of the Cortex-A7 processor, and features fast switching between the two to conserve power when the workload is reduced. NVIDIA Corporation of Santa Clara, Calif., USA, offers a Variable SMP technology using multiple Cortex-A9 cores along with a special "battery saver" core which can be quickly switched to when the workload is reduced. Texas Instruments Incorporated of Dallas, Tex., USA, offers the OMAP(™) 5 platform with two Cortex-A15 high performance cores and two Cortex-M4 low power cores, and the SMARTREFLEX(™) 3 technologies which help reduce power consumption by adapting voltage and frequency based on device activity. A multi-core processor may also include one or more cores implemented as one or more communication processors. A communication processor may also have multiple cores.

As used herein, the term "application programming interface" or API refers to a set of routines, data structures, object classes and/or protocols provided by libraries and/or operating system services in order to support the building of applications.

As used herein, the term "modular" refers to a software component which generally accomplishes a specific function in a generally self-contained manner, with clear logical boundaries representing a separation of concerns relative to other modules. A module's interface expresses the elements which are provided and required by the module, and the elements defined in the interface may be detectable by other modules. Communication between modules via their interfaces may be done using message passing or call interfacing, for example.

Figure 2:
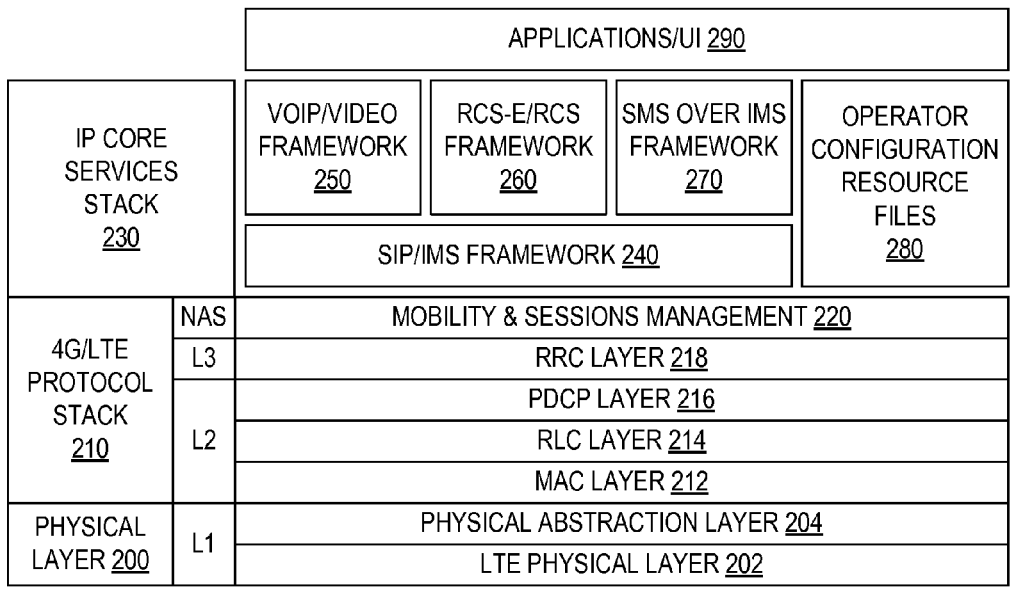
FIG. 2 is a schematic diagram of an abstraction model of client architecture for an illustrative implementation of VoLTE.

FIG. 2 is a schematic diagram of an illustrative abstraction model of client architecture for real-time IP communications. While the abstraction model focuses on 4G/LTE, is it in principle applicable to other types of IP networks such as Wi-Fi, WiMAX and 3G. At the radio interface, the model is shown as a three layer protocol stack. The physical layer L1 includes a LTE physical sublayer 202 and a physical abstraction sublayer 204. A 4G/LTE protocol stack is shown in two layers L2 and L3. Layer L2 includes a Media Access Control ("MAC") sublayer 212, a Radio Link Control ("RLC") sublayer 214, and a Packet Data Convergence Protocol ("PDCP") sub layer 216. Layer L3 includes a Radio Resource Control ("RRC") sub layer 218. Operating over layers L1, L2 and L3 is the Mobility and Session Management or Non-Access Stratum ("NAS") layer. The protocol stacks L1, L2, L3 and NAS constitute a 4G/LTE modem.

An IP core services stack 230 operates outside of the radio interface, and includes core services such as a SIP/IMS framework 240, Voice over IP ("VoIP")/Video framework 250, RCS-e/RCS framework 260, and SMS over IMS framework 270. The frameworks 250, 260 and 270 are modular and plug into the SIP/IMS framework 240, which also is modular. Other frameworks (not shown) may be prepared and plugged into the SIP/IMS framework 240 as well. The SIP/IMS framework 240 for the Internet Protocol Multimedia Subsystem ("IMS") may be a standardized architecture which uses a Voice-over-IP ("VoIP") implementation based on a 3GPP standardized implementation of the Session Initiation Protocol ("SIP"), and runs over the open standard IP protocols. Existing phone systems (both packet-switched and circuit-switched) are supported. The SIP/IMS framework 240 may include protocol stacks, an application controller, a start-up engine, and a user agent engine. The voice/video framework 250 may include a VoIP engine, supplemental services, high definition voice, and video calling, and may be IR 92 compliant. The RCS-e/RCS framework 260 may include a presence engine, IP messaging engine, contact and group engine, file transfer engine, and a video share engine. The SMS over IMS framework also may be IR 92 compliant.

The SIP/IMS framework 240 contains a collection of software components which may include, for example, engines such as SIP User Agent and IMS Startup, and enablers such as IMS Library, SIP, SigComp, Presence, XDM, MSRP, RTP, RTCP. Enablers. SIP, RTP, RTCP and MSRP are also protocol stacks—SIP enabler implements SIP Protocol Stack, RTP enabler implements RTP Protocol Stack, RTCP enabler implements RTCP Protocol Stack, and MSRP enabler implements MSRP Protocol Stack.

The VoIP/Video framework 250 contains a collection of software components such as a VoIP ALC and a Video ALC. This framework implements functions such as one-to-one voice call over IP network, multi-party conference calls, and associated supplementary features such as call hold, call mute, and so forth. Functions may be defined by popular industry forums such as GSMA, 3GPP, OMA, IETF, and may be customized by service providers or other vendors in the ecosystem.

The RCS-e/RCS framework 260 contains a collection of software components such as a RCS-e ALC and a RCS ALC. This framework implements functions such as Instant Messaging, one-to-one or multi-party chats, presence, video sharing, image sharing and file transfer. Functions may be defined by popular industry forums such as GSMA, 3GPP, OMA, IETF, and may be customized by service providers or other vendors in the ecosystem.

The SMS over IMS framework 270 contains a collection of software components such as a SMS ALC. This framework implements functions such as sending and receiving SMS messages over IP network. Functions may be defined by popular industry forums such as GSMA, 3GPP, OMA, IETF, and may be customized by service providers or other vendors in the ecosystem.

The frameworks may be divided or combined if desired, and some elements of a framework may be moved to other frameworks and even to other processor cores. The VoIP/Video framework 250, for example, may be divided into a VoIP framework and a Video framework, if desired. However, care is needed to avoid degradation in performance and quality of the functions provided by the framework.

Operator configuration resource files 280 are customized for each operator and are provided for such parameters as custom timer values, domain names, compression and security parameters, and so forth.

Applications and user interface 290 operates over the frameworks 250, 260 and 270. The user interface may be prepared by the original equipment manufacturer, while the applications may be prepared by the original equipment manufacturer or by third parties.

Advantageously, the core service frameworks may be distributed among the application processor 110 and the communication processor 140 to achieve a desired balance of power conservation, media latency, quality of service, and other factors. FIG. 3, FIG. 4, FIG. 5, FIG. 6 and FIG. 7 show various illustrative distributions of frameworks in a device chipset/SoC.

Figure 3:
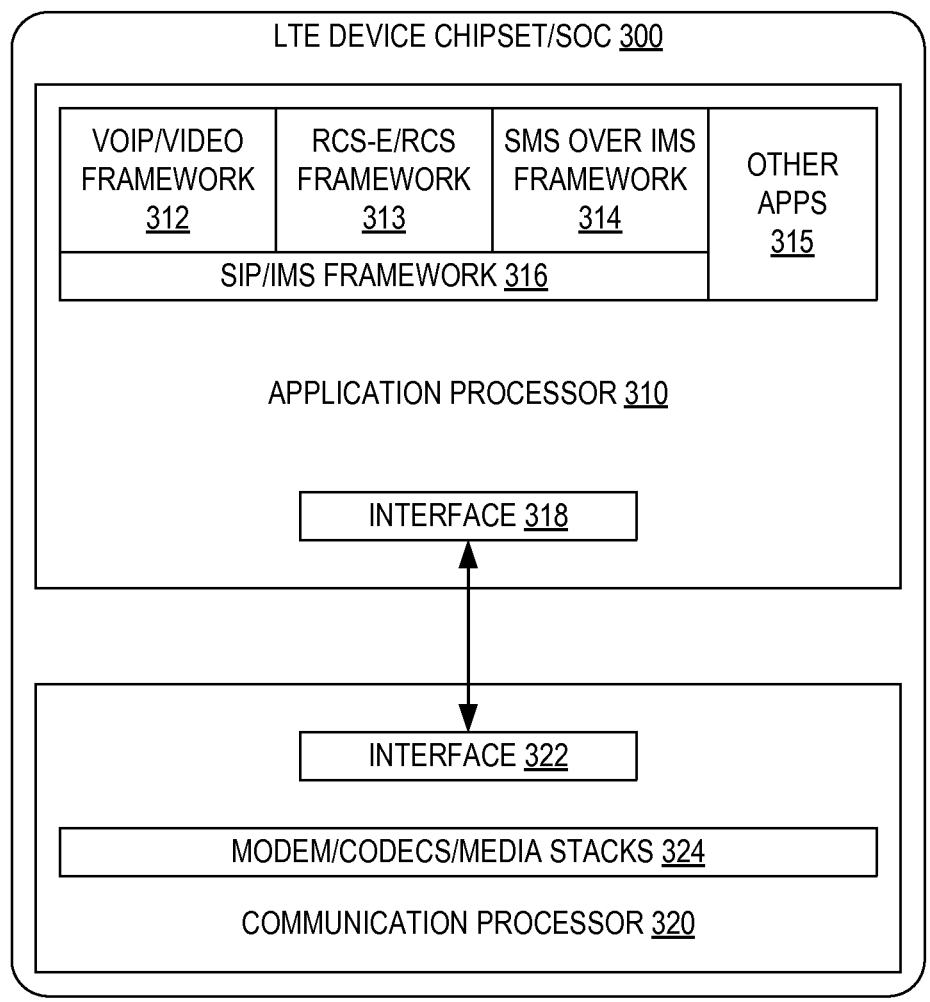
FIG. 3 is a schematic block diagram showing a distribution of frameworks within a chipset or SoC device.

In the FIG. 3 distribution, modem service (such as the 4G/LTE protocol stacks 210 shown in FIG. 2), codecs and media stacks 324 run on communication processor 320. The modem service, codecs and stacks 324 may be embedded in the communication processor 320 along with the operating system (not shown), for adequate performance and low power consumption. An operating system (not shown) for application processor 310, a user interface (not shown), a SIP/IMS framework 316, a VoIP/Video framework 312, A RCS-e/RCS framework 313, a SMS over IMS framework 314, and other applications 315 such as, for example, various third party user applications (not shown), are installed on the application processor 310. Interface 318 in the application processor 310, and interface 322 in the communication processor 320, handle communications between the application processor 310 and the communication processor 320 in various ways well known in the art, depending on the manufacturer of the particular chipset or SoC device. This distribution concentrates many services in the application processor 310, so that the communication processor 320 may be simplified.

The concentration of the real time communication modules on the application processor 310 as shown in FIG. 3 is particularly suitable for devices where multiple communication services need to co-exist and be active at the same time. A use case example would be when the end user is in an active video conference while also either browsing and/or texting to contacts. Communication processors typically are not designed to handle such multiple, simultaneous communication services without compromising service quality and/or performance.

A factor favoring the FIG. 3 distribution is to allow the end user to take full advantage of the newer 4G/LTE network services without compromising service quality and/or performance. Another favorable factor is that these multimedia services are independent of communication processor and network access technology, so that different communication processors may be used for accessing different IP networks such as, for example, 4G/LTE Wi-Fi, WiMAX an 3G. This option also allows the communication processor 320 to be shut down when that network access is not required, thus tending to reduce power consumption.

A factor disfavoring the FIG. 3 distribution is the increased battery power consumption by the application processor 310, although this may be justified by the various types of services the end user enjoys. Another disfavoring factor is the voice delays in the device could occur because the audio processing resides in the application processor 310 while the network interface resides in the communication processor 320. However, a high speed interface may be used between the application processor 310 and the communication processor 320 so that the delays are reduced to a negligible level.

Figure 4:
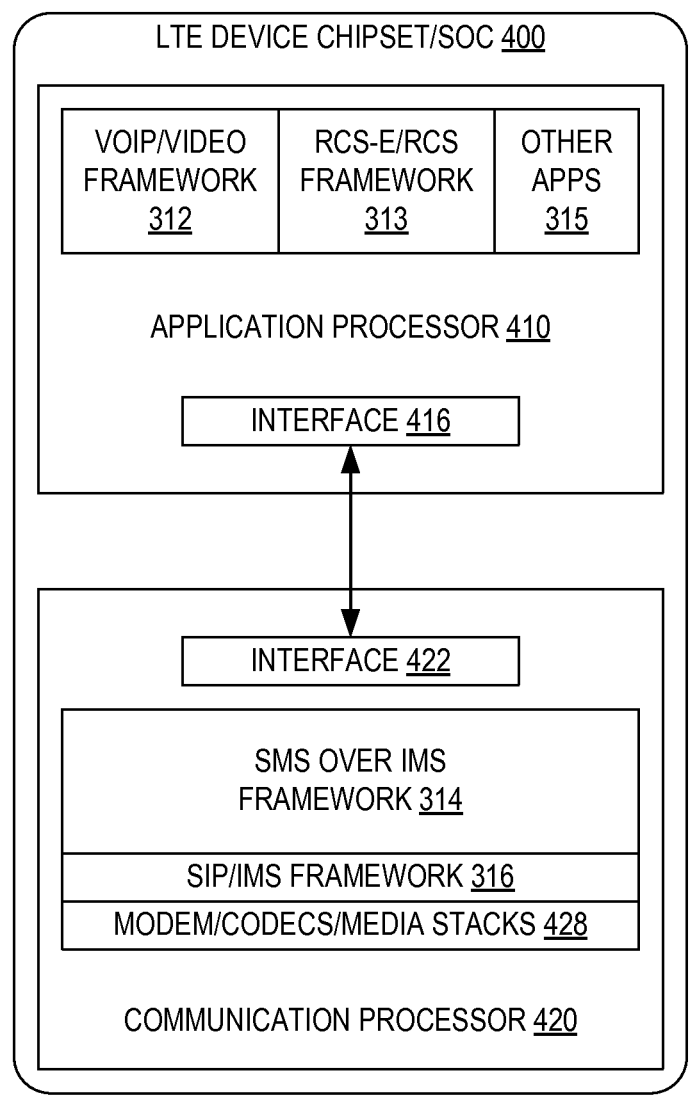
FIG. 4 is a schematic block diagram showing another distribution of frameworks within a chipset or SoC device.

In the FIG. 4 distribution, modem service, codecs and media stacks 428 along with SIP/IMS framework 316 and SMS over IMS framework 314 run on communication processor 420, and may be embedded in the communication processor 420 along with the operating system (not shown) for adequate performance at reduced power consumption. An operating system (not shown) for application processor 410, a user interface (not shown), a VoIP/Video framework 312, a RCS-e/RCS framework 313, and other applications 315 are installed on the application processor 410. Interface 416 in the application processor 410, and interface 422 in the communication processor 420, handle communications between the application processor 410 and the communication processor 420 in various ways well known in the art, depending on the manufacturer of the chipset or SoC device in question. This distribution is advantageous to chipset and SoC manufacturers because many of the relatively simple and low power demand functions are installed on the communication processor 420 for improving power conservation, while the advanced functions are installed on the application processor 410.

Figure 5:
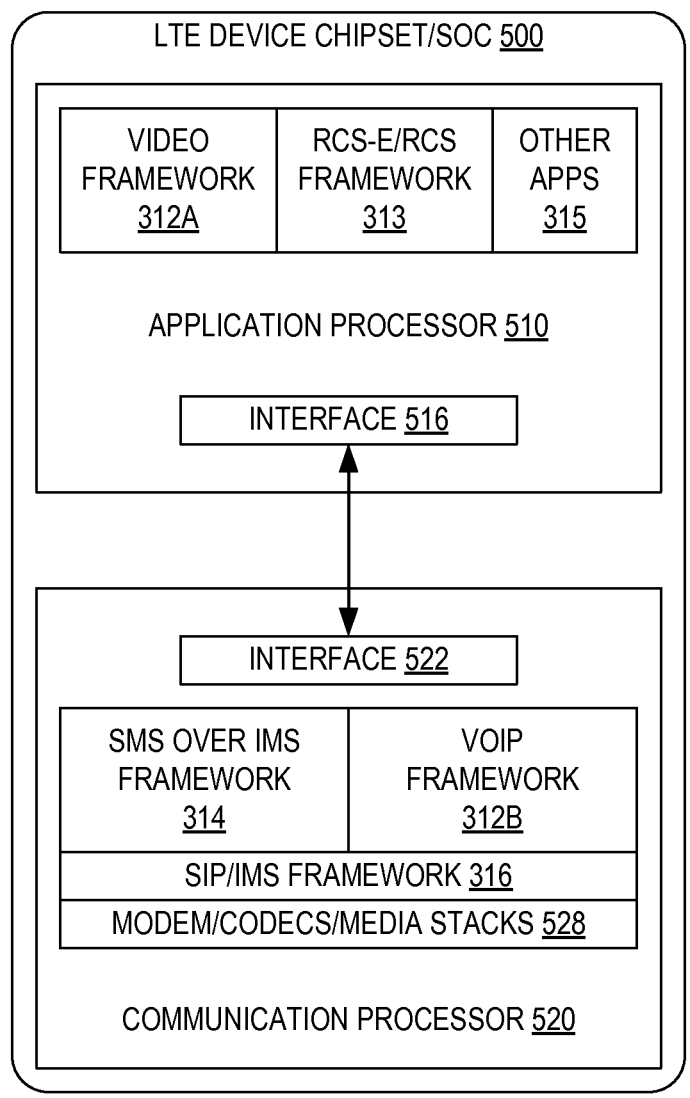
FIG. 5 is a schematic block diagram showing another distribution of frameworks within a chipset or SoC device.

In the FIG. 5 distribution, modem service, codecs and media stacks 528 along with SIP/IMS framework 316, SMS over IMS framework 314, and a VoIP framework 312B run on communication processor 520, and may be embedded in the communication processor 520 along with the operating system (not shown) for adequate performance at reduced power consumption. An operating system (not shown) for application processor 510, a user interface (not shown), a Video framework 312A, a RCS-e/RCS framework 313, and other applications 315 are installed on the application processor 510. Interface 516 in the application processor 510, and interface 522 in the communication processor 520, handle communications between the application processor 510 and the communication processor 520 in various ways well known in the art, depending on the manufacturer of the chipset or SoC device in question. The FIG. 5 distribution is similar to the FIG. 4 distribution but for the use of separate frameworks for the VoIP and video functions. The VoIP framework 312B may be separated from the video framework 312A and designed for low power consumption, and thereby is suitable to be installed on the communication processor 520, while the higher performance video framework 312A may be installed on the application processor 510 which is capable of handling it.

In the distributions shown in FIG. 4 and in FIG. 5, some communication modules are installed on the application processor 410/510 while some are installed on the communication processor 420/520. This distribution is particularly suitable for devices where for a majority of the time the user uses SMS (FIG. 4) or voice calls and SMS (FIG. 5), and only occasionally uses video or RCS services. The high speed interface between the application processor 410/510 and the communication processor 420/520, and the RTOS running in the communication processor 420/520, allows state sharing without compromising quality and performance of the voice calls.

A factor favoring the FIG. 4 and FIG. 5 distributions is the optimal use of battery power with only a slight burden on the communication processor 420/520 to share state and maintain quality and performance of voice calls when video or RCS services are used. Another favorable factor of the FIG. 5 distribution in particular is to keep SMS and voice services onto an isolated subsystem (the communication processor 420/520) which is protected from interrupts from the rest of the system, such as user pressing keys or turning displays ON and so forth. A further advantage is enhanced power savings by allowing the application processor 510 and the screen and screen controller (not shown) to be turned off during a voice call.

A factor disfavoring the FIG. 4 and FIG. 5 distributions is the need to carefully synchronize voice and video streams because the voice stream is done in the communication processor 420/520 while the video stream is done in the application processor 410/510. Without suitable care, other operations by either the application processor or the modem processor may adversely affect the quality and performance of video calls. Another disfavoring factor is that the network registration status and communication sessions states are maintained by the communication processor, so that care is needed in providing for their use by other communication services such as video and RCS to avoid impacting the quality and performance of voice calls. A further disfavoring factor is that the core services such as SMS and voice are tied to a selected set of networks so that if these services are to use other networks supported by other communication processors in the device, care needs to be taken to avoid impacting the quality and performance of voice calls.

Another option (not shown) is to embed all or nearly all real time communication modules in the communication processor. This option is suitable for devices where the application processor does not have support for effective power management or a low power core per se, such as a battery saver core. Since the communication processor typically runs a single core and uses a compact real time operating system with very limited system resources such as run time memory, stack space, and threads, care should be taken to embed only the components or modules needed for real time communications, and to reduce the number of supported real time communication services.

Figure 6:
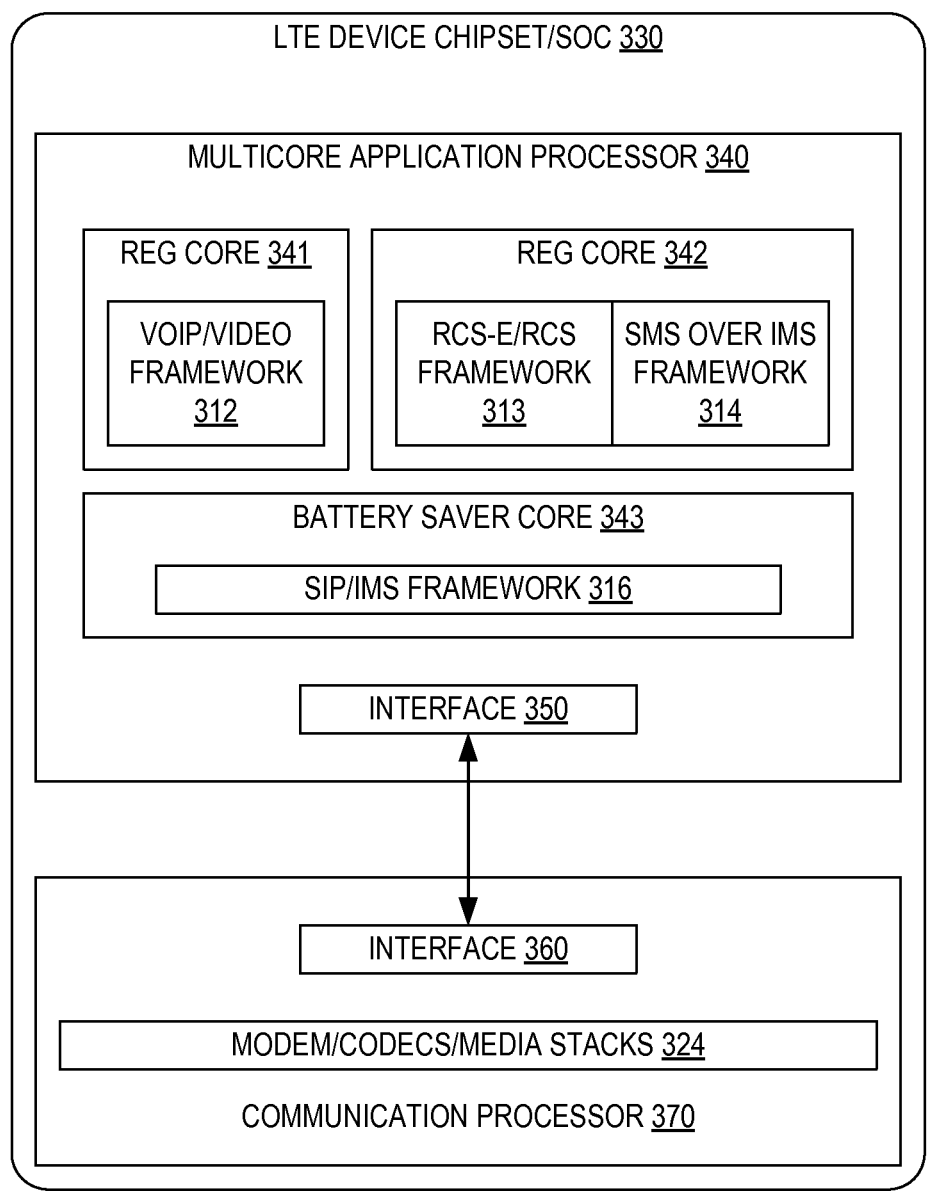
FIG. 6 is a schematic block diagram showing another distribution of frameworks within a chipset or SoC device having a multicore application processor.
Figure 7:
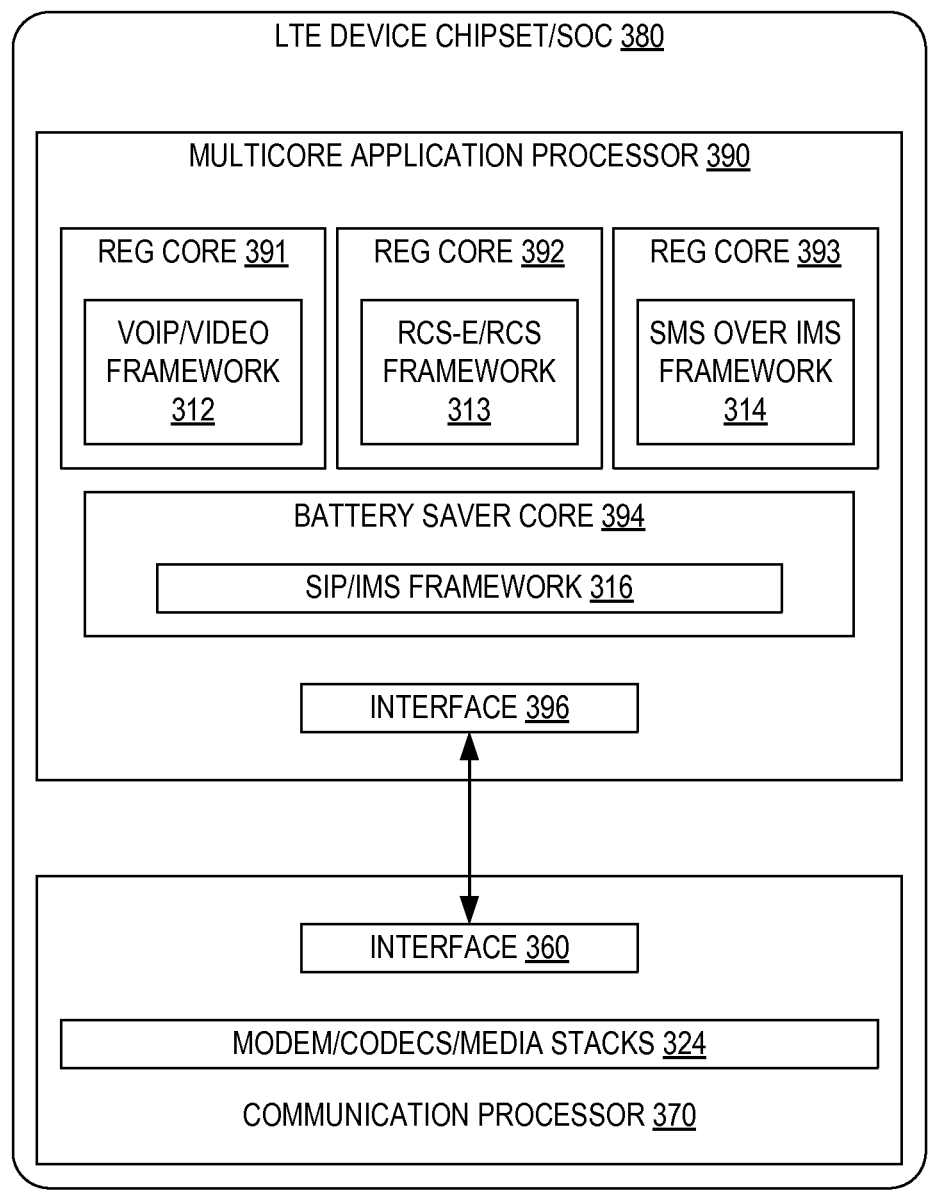
FIG. 7 is a schematic block diagram showing another distribution of frameworks within a chipset or SoC device having a multicore application processor.

Application processors having multiple cores are now readily available, so that the concentration of the real time communication modules in the application processor as shown in FIG. 3 may be a distribution across the multiple cores, as shown in FIG. 6 and FIG. 7. One of the multiple cores may be a battery saver core, which is especially suitable for running the SIP/IMS framework. The cores may also have aggressive power management so that a core may be slowed down if high performance is not required, or even powered off. In another distribution (not shown) particularly suitable for devices primarily used for VoLTE and SMS services, the VoIP framework and the SMS over IMS framework may be installed on the battery saver core, so that when only voice or SMS services are being used, the cores other than the battery saver core may be turned off to save battery power.

In the illustrative FIG. 6 distribution, modem service (such as the 4G/LTE protocol stacks 210 shown in FIG. 2), codecs and media stacks 324 run on communication processor 370. The modem service, codecs and media stacks 324 may be embedded in the communication processor 370 along with the operating system (not shown), for adequate performance at lower power consumption. An operating system (not shown) and a user interface (not shown) for multicore application processor 340 are installed in any suitable manner, as is well known in the art. The VoIP/Video framework 312 may be installed on a regular core 341, the RCS-e/RCS framework 313 and the SMS over IMS framework 314 may be installed on a regular core 342, and the SIP/IMS framework 316 may be installed on a battery saver core 343. Other applications (not shown), various third party user applications, may be installed on either the regular cores 341 and 342 or on the battery saver core 343, as appropriate. Interface 350 in the application processor 340, and interface 360 in the communication processor 370, handle communications between the application processor 340 and the communication processor 370 in various ways well known in the art, depending on the manufacturer of the particular chipset or SoC device.

In the illustrative FIG. 7 distribution, modem service (such as the 4G/LTE protocol stacks 210 shown in FIG. 2), codecs and media stacks 324 run on communication processor 370. The modem service, codecs and media stacks 324 may be embedded in the communication processor 370 along with the operating system (not shown), for adequate performance at low power consumption. An operating system (not shown) and a user interface (not shown) for multicore application processor 390 are installed in any suitable manner, as is well known in the art. The VoIP/Video framework 312 may be installed on a regular core 391, the RCS-e/RCS framework 313 may be installed on a regular core 392, and the SMS over IMS framework 314 may be installed on a regular core 393, and the SIP/IMS framework 316 may be installed on a battery saver core 394. Other applications (not shown), various third party user applications, may be installed on either the regular cores 391, 392 and 393 or on the battery saver core 394, as appropriate. Interface 396 in the application processor 390, and interface 360 in the communication processor 370, handle communications between the application processor 390 and the communication processor 370 in various ways well known in the art, depending on the manufacturer of the particular chipset or SoC device.

As will be appreciated from the attributes, advantages and disadvantages described with respect to the distributions of FIG. 3, FIG. 4, FIG. 5, FIG. 6 and FIG. 7, many factors may be considered and balanced in deciding on the proper distribution of services for the particular type of chipset/SOC and purpose of the device. Services which need to be frequently or continuously active and which may be designed for low power operation are suitable for installing on a communication processor or on a battery saver core of a multicore processor. Embedding where possible may reduce power consumption. High performance services such as the video framework and the RCS-e/RCS framework are suitable for installation on regular cores, but may be grouped together in certain ways to take advantage of any power management features offered by one or more of the cores. Illustratively, a video framework may be installed on the same regular core as a display controller while a VoIP framework may be installed on a different core or cores, so that during a voice call the screen may be turned off and the core on which the video framework and the display controller are installed may be shut down or put into sleep or standby. Advantageously, the modular real time communication client architecture is flexible enough to support a great many different distributions, so that device manufactures may choose a distribution best suited to their purposes, and may implement the choice either at the factory or in the field using Over-the-Air ("OTA") updates.

While the video framework may be installed on the regular core or battery saver core of an application processor or on a communication processor, it is particularly suitable for installation on a regular core of a single or multicore application processor. The video application typically handles all video whether real time or stored, although separate applications for real time and stored images may be used if desired. However, video may communicate through an interface between the application processor and its own network, and neither uses an IMS network nor has had need for the communication processor.

While the RCS-eRCS framework may be installed on the regular core or battery saver core of an application processor or on a communication processor, it is particularly suitable for installation on a regular core of a single or multicore application processor. RCS is a collection of services, including presence, instant messaging, video and image share, chat, and file transfer. RCS-e is a subset of those services. These are IMS-based service, and so need an IMS network to deploy. However, because RCS services commonly involve interaction with the user and hence activation of the display screen, they tend to have high power consumption needs and so are suitable for installation on a regular core, possibly along with the display controller.

Implementation Examples

Figure 8:
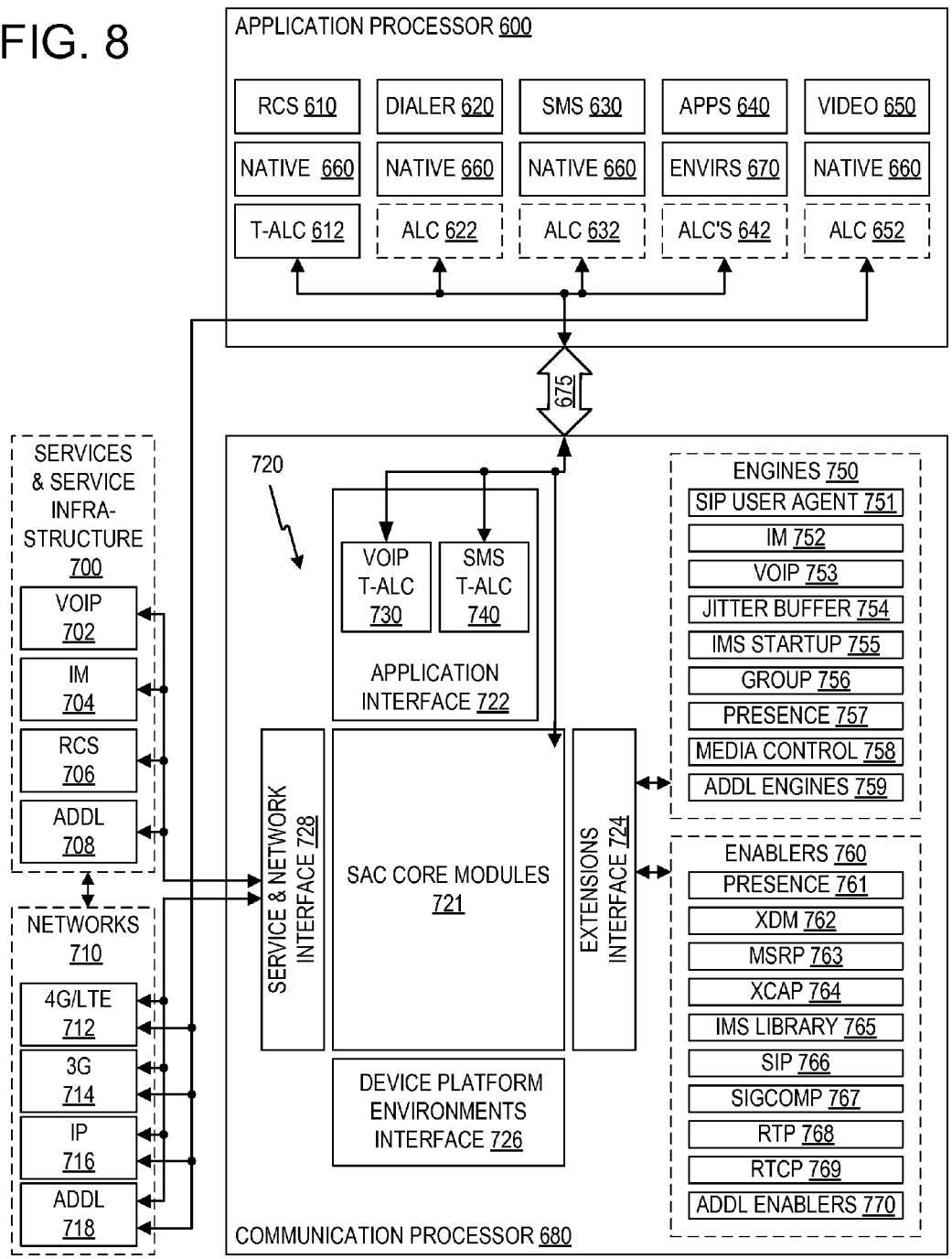
FIG. 8 is a schematic block diagram of an illustrative implementation of the distribution of FIG. 5 using a services and applications controller architecture.

FIG. 8 is a schematic block diagram of an implementation of the distribution shown in FIG. 5 using a Services and Application Controller ("SAC") 720. The components of the SAC 720 are suitable for installation on communication processor 680 because they may be designed to operate with low power consumption, and may be embedded therein if desired for better performance. Even components which operate frequently or continuously are suitable for installation on the communication processor 680 if designed for low power operation. Although the SAC 720 has many components, excessive cumulative power consumption may nonetheless be avoided because all of the components of the SAC 720 that are installed on the communication processor 680 need not be active at the same time. Other components of the SAC 720 which operate with high power consumption may be installed on the application processor 600. Distribution of components of the SAC 720 among the application processor 600 and the communication processor 680, and sharing thereof, is facilitated by a well-defined and high speed interface 675 for message passing.

The SAC 720 includes four interfaces which respectively interact with four different environments. An application interface 722 interacts with one or more applications and one or more application environments such as, for example, a native application environment (for example, Android, Linux, iOS, Windows Mobile, Symbian and Brew Mobile Platform), a procedural runtime environment such as Java, and a declarative runtime environment (for example, AJAX based widget environments like Yahoo Widgets and Webkit Run-Time, proprietary environments like Adobe's Flash Lite, and browsers enabled with AJAX or proprietary plug-ins like Microsoft Silverlight and Adobe Flash and Air). An extensions interface 724 interacts with engines 750 and enablers 760. Device platform environments interface 726 has a capability of interfacing with any one of various device platform environments, including various platform drivers (for example, Android, Linux, iOS, Windows Mobile, Brew Mobile Platform, and QNX). A service and network interface 728 interacts with services and service infrastructures 700 and with networks 710.

The SAC 720 provides a set of core functions and capabilities (not shown) that are shared by the four environments and abstracts the environments from each other, which enable interactions between these environments without requiring that the environments be aware of specific aspects of the other environments for the interactions. In a SAC implementation, the various frameworks may include (share) one or more of the core functions. A suitable illustrative set of core functions includes a communication module, an extension module, a state module, a data management module, a policy module, a signaling module, and administration module, and a server module.

A communication module includes session management, service management, network management, and quality of service (QoS), and is responsible for managing resources for channels used to communicate with services and service infrastructure 700 and networks 710. An application module is the primary interface to applications through application logic controllers, and provides deployment and un-deployment of applications within the SAC 720, maintains state of the application, provides filter criteria used to route information or signals to and from applications, maintains a table of registered applications and application mappings, resolves conflicts among applications, and manages queuing and prioritizing requests from applications to various other modules within the SAC 720.

An extension module is responsible for managing integration and support of application engines 750 and enablers 760. The extension module loads an extension for an application when the application manager sends a request for it, and may also load any other extensions that the current extension needs. Loading may be done from on-platform sources such as memory or storage devices, or from a server over the network. The extension module also maintains a table that maps the applications and the extension(s) they are using.

A state module is responsible for state management, including aggregating state, and sharing state information among and between various applications such as RCS 610, dialer 620, SMS 630, other applications 640 and video 650, application engines 750, services and service infrastructure 700, and the device platform through the device platform environments interface 726. The state module interfaces with other managers and interfaces within the SAC 720 to share state information among applications, engines, device modules and services.

A data management module is responsible for management of data within the SAC 720 and for storage of internal data from various modules of the SAC 720, as well as providing data sharing services from the interface components such as the applications RCS 610, dialer 620, SMS 630, other applications 640 and video 650, and the application engines 750.

A policy module handles the policy functions of the SAC 720, which are used to provide operational management parameters, access control, and administer security and privacy policies.

A signaling module is responsible for parsing signals from applications, engines, device and services, and for routing them to appropriate destinations.

An administration module is responsible for keeping track of the internal functions of the SAC 720. The administration module accesses data and information stored using the data management module, and makes it available to an administration application (not shown).

A server module is responsible for invoking other modules in the SAC 720 based on requests from any of the modules or the interfaces. The server module is also responsible for performing discovery requests to the SAC 720 to provide capabilities information to applications, engines, services, and device platforms. The server module is also responsible for passing data or signals from the SAC 720 to applications or engines using Inter-Process Communication.

The application interface 722, the extension interface 724, the device platform environments interface 726, and the service and network interface 728 contain abstracted application program interfaces ("API"). The SAC 720 relies on the abstracted API's for translating between the various environments. API's are provided in the application interface 722, for example, that are abstracted from each supported application programming language for various functions common to the supported application programming language. API's are provided in the device platform environments interface 726, for example, that are abstracted from each type of supported platform. In a similar manner, the extension interface 724 and the service and network interface 728 contain "abstracted" API's. Advantageously, each of the various environments may use functions in other environments without having to have any particular knowledge of how functions are performed by those other environments.

The application interface 722 includes various Application Logic Controllers ("ALC's"), which incorporate various API's, including the abstracted API's, and application logic. The ALC's which incorporate abstracted API's and which may be referred to as translator API's. The extensions interface 724, which enables the SAC to interact with many different application engines 750 and technology and standards enablers 760, includes other abstracted API's. The device platform environments interface 726 includes various platform drivers ("PFD") which include abstracted API's for supporting integration with various platform resources and functions used by the SAC 720 and the applications 610, 620, 630, 640 and 650, the application engines 750, and the enablers 760. The services and network interface 728, which allows the SAC 720 to interact with many different services and service infrastructures 700 and many different types of networks 710 (legacy networks not shown but may be included if desired), includes other abstracted API's.

The application interface 722 is installed on the communication processor 680, and includes various translator ALC's which may be installed either on the communication processor 680 or on the application processor 600 depending on their power consumption and operating time characteristics. A VoIP translator ALC 730 and a SMS translator ALC 740 are designed for low power consumption and are installed on the communication processor 680. The RSC translator ALC 612, on the other hand, is a relatively high power consumption component and so is installed on the application processor 600. The application interface 722 interacts with one or more application environments such as native environment 660 and other environments 670 which illustratively are installed on application processor 600, and one or more applications such as RCS application 610, dialer application 620, SMS application 630, and other applications 640 which illustratively are installed on the application processor 600.

The device platform environments interface 726, which is a platform abstraction and porting layer that includes platform drivers ("PFD"), is installed on the communication processor 680.

The service and network interface 728 is also installed on the communication processor 680, and includes API's which abstract variations in services and service infrastructure and in network infrastructure. The service and network interface 728 performs various functions including connection management, QoS management, session management, network bearer management, and network protocols.

The extension interface 724, engines 750, and enablers 760 are also installed on the communication processor 680. The extension interface 724 supports modular and flexible application engine and technology and standards enabler library integration using abstracted API's, which (a) allows for exchange of engines and libraries independent of applications for upgrades and special cases; and (b) supports state data sharing between engines through a common and controlled interface. The extensions interface 724 allows the application engines 750 (the enablers 760 are generally stateless) to share the state maintained in the SAC 720. The engines 750 and the enablers 760 may therefore be changed or upgraded without changing the API's used to access them, and independent of the applications that use them. Moreover, third party technology providers may integrate their own additional application engines 750 and enablers 770 into the SAC 720 through the extensions interface 724.

Managing user and application data, maintaining state transitions, providing data packing and management are typical functions of an application engine. Two categories of application engines may be envisioned: general purpose and application specific. The general purpose engines are typically used by many applications and application logic controllers, or when the system boots up. The engines 750 illustratively shown in FIG. 8 include the following categories of engines: (a) basic engines for all or many services, such as, for example, SIP user agent 751 (which is used by many SIP applications such as VoIP and IM) and IMS startup engine 755; (b) VoIP engines such as, for example, VoIP 753, jitter buffer 754, and media control 758; and (c) RCS engines such as, for example, IM 752, group 756 and presence 757. Additional engines 759 may be provided as desired.

Enablers 760 are generally "stateless," that is they perform functions that do not require state information to be kept, and usually operate on a "request-response" model. They generally implement protocols defined by industry standards or specific technologies. The enablers 760 illustratively shown in FIG. 8 include the following categories of engines: (a) basic enablers for all or many services, such as, for example, IMS library 765 and SIP 766; (b) VoIP enablers such as, for example, SigComp 767 and RTP 768; and (c) RCS enablers such as, for example, presence 761, XDM 762, MSRP 763, XCAP 764, and RTCP 769. Examples of industry standard enablers include modules that perform protocols such as SIP, HTTP, RTP, RTCP, SigComp, IMS Library functions, XDM, MSRP, presence, and device management. Examples of enablers based on proprietary specifications include functions and protocols like location, digital identity, digital rights, and security protocols. Additional enablers 770 may be provided as desired.

The application engines 750 and the enablers 760 may have "dual" API access, in that they may be integrated to and accessed through SAC using API's in the application interface 722, and they may also be accessible directly from an application or using direct access from other application engines 750 when the functions of the SAC 720 are not needed. In some cases, engine and enabler stacks may be layered to provide a common set of functions and API's that support multiple methods.

With the video 650 and ALC 652 being installed on the application processor 600, communications (not shown) by the video 650 across the interface 675 may be done if sufficient bandwidth is available in the interface 675. Voice and audio synchronization may be performed internally or in the networks. Otherwise, as shown in FIG. 8, a direct connection such as a PCP/IP socket connection may be made between the video 650 and the networks, illustratively 4G/LTE network 712, 3G network 714, IP network 716, and in some cases even additional networks 718. In this event, voice and audio synchronization may be performed in the networks.

The following example of how a VoLTE call may be made highlights some of the principles describe herein. The user begins by invoking the dialer 620 which runs on the application processor 600. The dialer 620, which along with dialer ALC 622 may be considered to be a VoIP framework, interfaces with the user via a keypad, either hardware or virtual, and a display to set up the call. Dialer ALC 622, which runs on the application processor 600, communications through the interface 675 to the VoIP translator ALC 730, which actually places the call. The dialer ALC 622 need not have translation capabilities. When the call is established and in progress, the communication processor 680 actively maintains the call. However, the demands on the dialer 620 on other applications running on the application processor 600 are low, so that the application processor 600, upon notification from the communication processor 680, may go into a low power state (such as, for example, by reducing the operating frequency, the interrupt cycle, and/or power to various hardware components such as the display) or even into a sleep state.

Several SAC implementations are described in US Patent Application Publication No. US 2009/0222842 published Sep. 3, 2009 in the name of Narayanan et al., which hereby is incorporated herein in its entirety by reference thereto.

Figure 9:
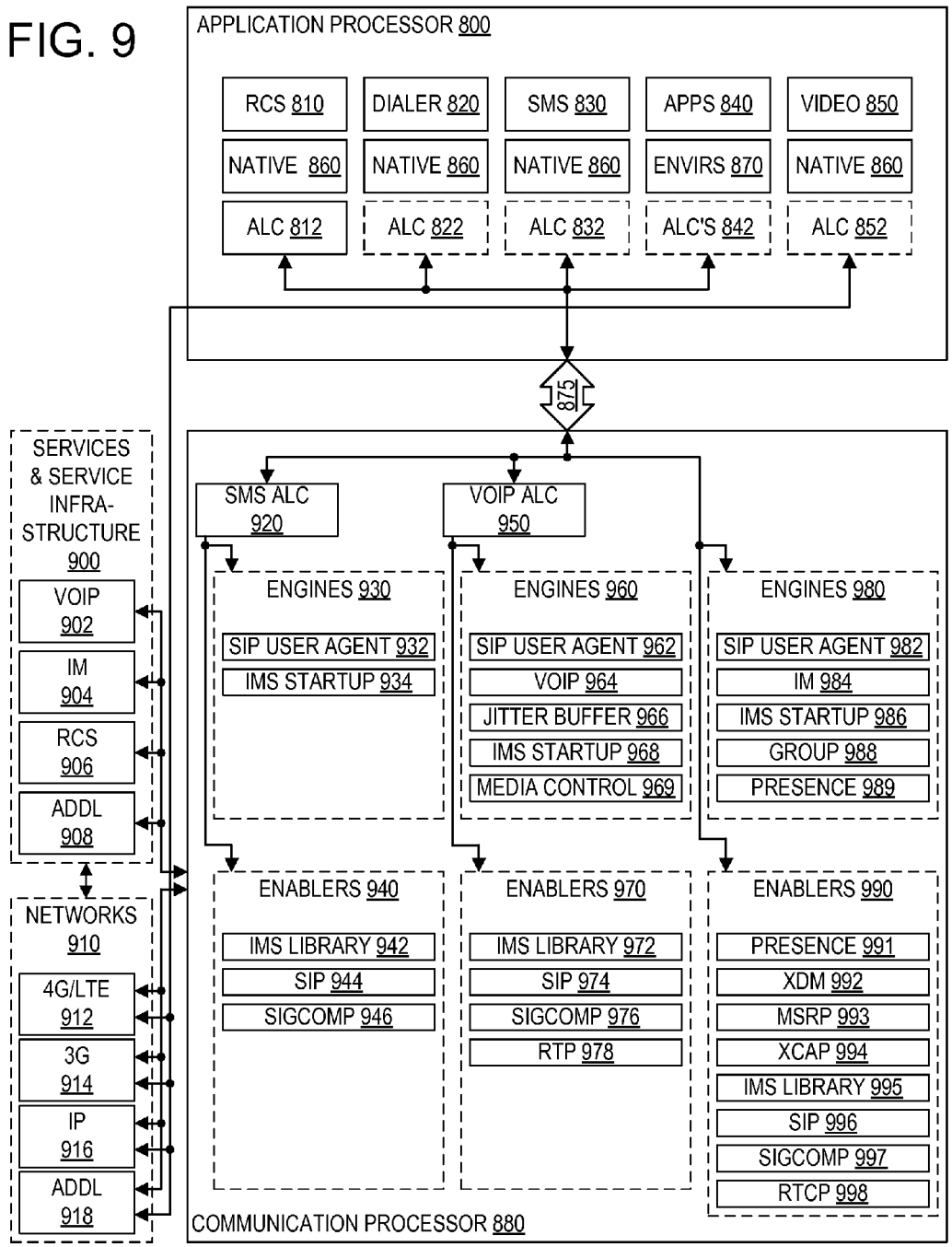
FIG. 9 is a schematic block diagram of an illustrative implementation of the distribution of FIG. 5 using a function call architecture.

While the SAC implementation approach which uses messaging is very attractive for many types of devices, including in particular 4G/LTE-enabled smartphones, other modular solutions which use other communication techniques between modules, such as, for example, function calls, may be suitable for some types of devices. FIG. 9 shows an implementation in which the ALC's do not communicate with a SAC core and need not have any translation capabilities, but instead use function calls to access the enablers and engines directly. The FIG. 9 implementation is based on the distribution shown in FIG. 5, although the function call approach may be used for any desired distribution of functions and services.

As shown in FIG. 9, the following applications are installed on application processor 800: RCS 810, dialer 820, SMS 830; other applications 840, and video 850. The following environments are installed on the application processor 800: native environment 860, and other environments 870. The following ALC's are installed on the application processor 800: RCS ALC 812, dialer ALC 822, SMS ALC 832, other ALC's 842, and video ALC 852. ALC's installed on the application processor 800 generally, but not necessarily, are provided by the application vendors.

Function calls are made to specific groups of engines and enablers and certain ALC's installed on the communication processor 880 through fast interface 875. Such engines, enablers and ALC's, may be embedded on the communication processor 880, if desired. SMS function calls, for example, may be made to a SMS ALC 920, which has access to engines 930, illustratively SIP user agent 932 and IMS startup 934, and to enablers 940, illustratively IMS library 942, SIP 944, and SigComp 946. VoLTE calls, for example, may be made to a VoIP ALC 950, which has access to engines 960, illustratively SIP user agent 962, VoIP 964, jitter buffer 966, IMS startup 968, and media control 969, and to enablers 970, illustratively IMS library 972, SIP 974, SigComp 976, and RTP 978. RSC calls from the application processor 800 may be made directly to engines 980 and enables 990. Engines 980 illustratively include SIP user agent 982, IM 984, IMS startup 986, group 988, and presence 989. Enablers 990 illustratively include presence 991, XDM 992, MSRP 993, XCAP 994, IMS library 995, SIP 996, SigComp 997, and RTCP 998. Note that generally speaking, similar engines and enablers may be included in different groups; that is, they are not shared.

With the video 850 and ALC 852 being installed on the application processor 800, direct calls (not shown) by the video 850 across the interface 875 may be done if sufficient bandwidth is available in the interface 875. Voice and audio synchronization may be performed internally or in the networks. Otherwise, as shown in FIG. 9, a direct connection such as a PCP/IP socket connection may be made between the video 850 and certain networks in the networks 910 (legacy networks not shown but may be included if desired), illustratively 4G/LTE network 912, 3G network 914, IP network 916, and in some cases even additional networks 918. In this event, voice and audio synchronization may be performed in the networks.

Figure 10:
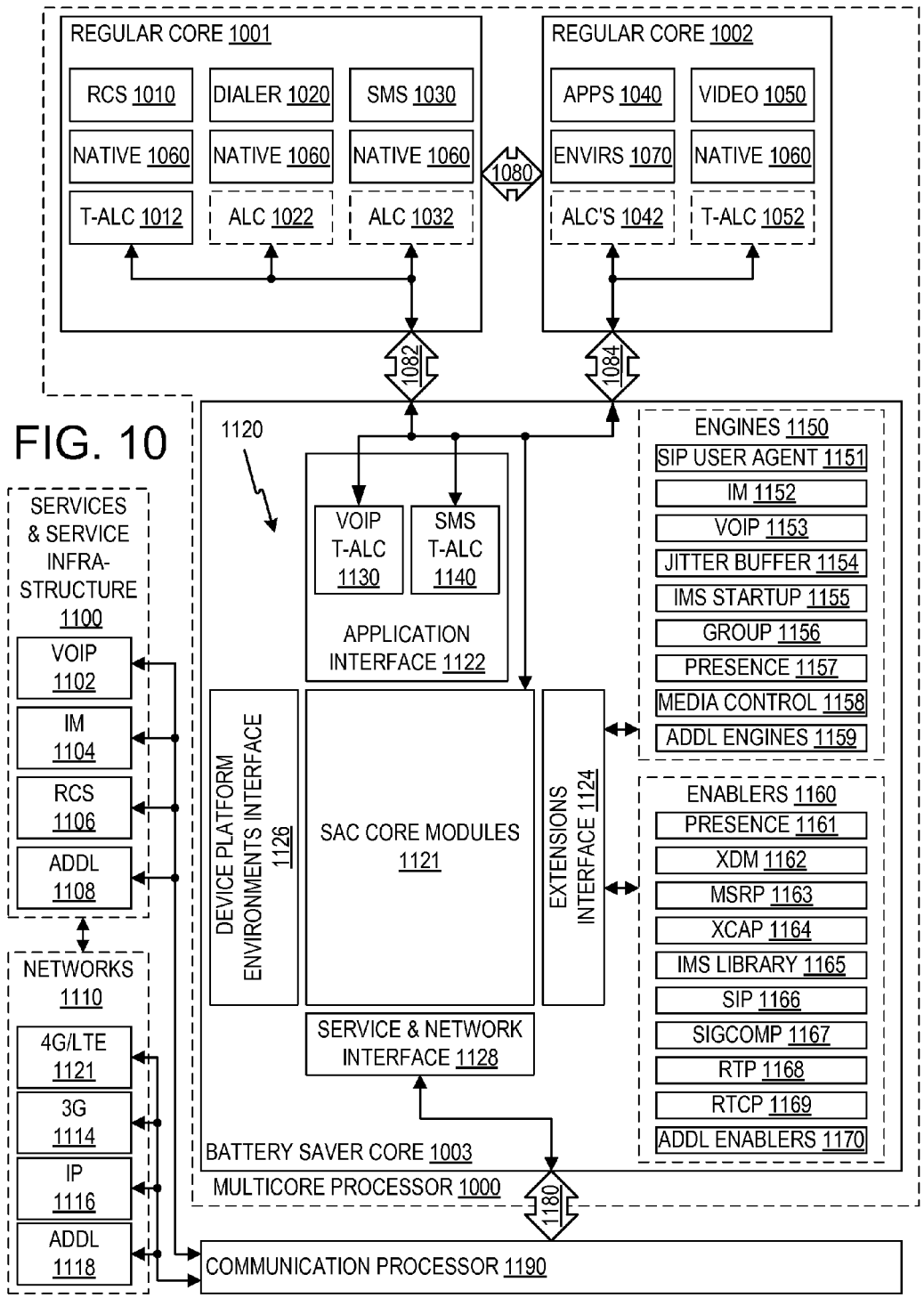
FIG. 10 is a schematic block diagram of an illustrative implementation of the distribution of FIG. 6 using a services and applications controller architecture.

FIG. 10 is a schematic block diagram of an implementation of the distribution shown in FIG. 6 on a multicore processor 1000 using a Services and Application Controller ("SAC") 1120. The components of the SAC 1120 are suitable for installation on a battery saver core 1003 of the multicore processor 1000 because they may be designed to operate with low power consumption, and may be embedded therein if desired for adequate performance at lower power consumption. Although the SAC 1120 has many components, excessive cumulative power consumption may nonetheless be avoided because all of the components of the SAC 1120 that are installed on the battery saver core 1003 need not be active at the same time. Distribution of various frameworks among the various cores of the multicore processor 1000, namely regular core 1001, regular core 1002, and battery saver core 1003, is facilitated by high speed inter-core interfaces 1080, 1082 and 1084. Communication between the service and network interface 1128 in the battery saver core 1003 and the communication processor 1190 is facilitated by a well-defined and high speed interface 1180. The interfaces 1082, 1084 and 1180 support message passing to and from the SAC 1120. The SAC 1120 and engines 1150 and enablers 1160 generally correspond to the SAC 720 and engines 750 and enablers 760 discussed with reference to FIG. 8.

The SAC 1120 includes application interface 1122, which generally corresponds to the application interface 722 (FIG. 8). The application interface 1122 includes on the communication processor 680, and includes various translator ALC's which may be installed either on the battery saver core 1003 or on one or more cores of of the multicore processor 1000 depending on their power consumption and operating time characteristics. Illustratively, a VoIP translator ALC 1130 and a SMS translator ALC 1140 are designed for low power consumption and are installed on the battery saver core 1003. The RSC translator ALC 1012 and the video translator ALC 1052 (the inter-core interface 1084 and the interface 1180 are presumed fast enough to handle the video transfer), on the other hand, are relatively high power consumption components and so are installed on the regular core 1001 and the regular core 1002 respectively of the multicore processor 1000. The application interface 1122 interacts with one or more application environments such as native environment 1060, which illustratively is installed on both of the regular cores 1001 and 1002 of the multicore processor 1000, and other environments 1070 which illustratively are installed on regular core 1002, and one or more applications such as RCS application 1010, dialer application 1020, SMS application 1030, which illustratively are installed on the regular core 1001, and video application 1050 and other applications 1040 which illustratively are installed on the regular core 1002. Communication to the dialer application 1020 and the SMS application 1030 is through ALC's 1022 and 1032, which need not have translation capabilities.

Figure 11:
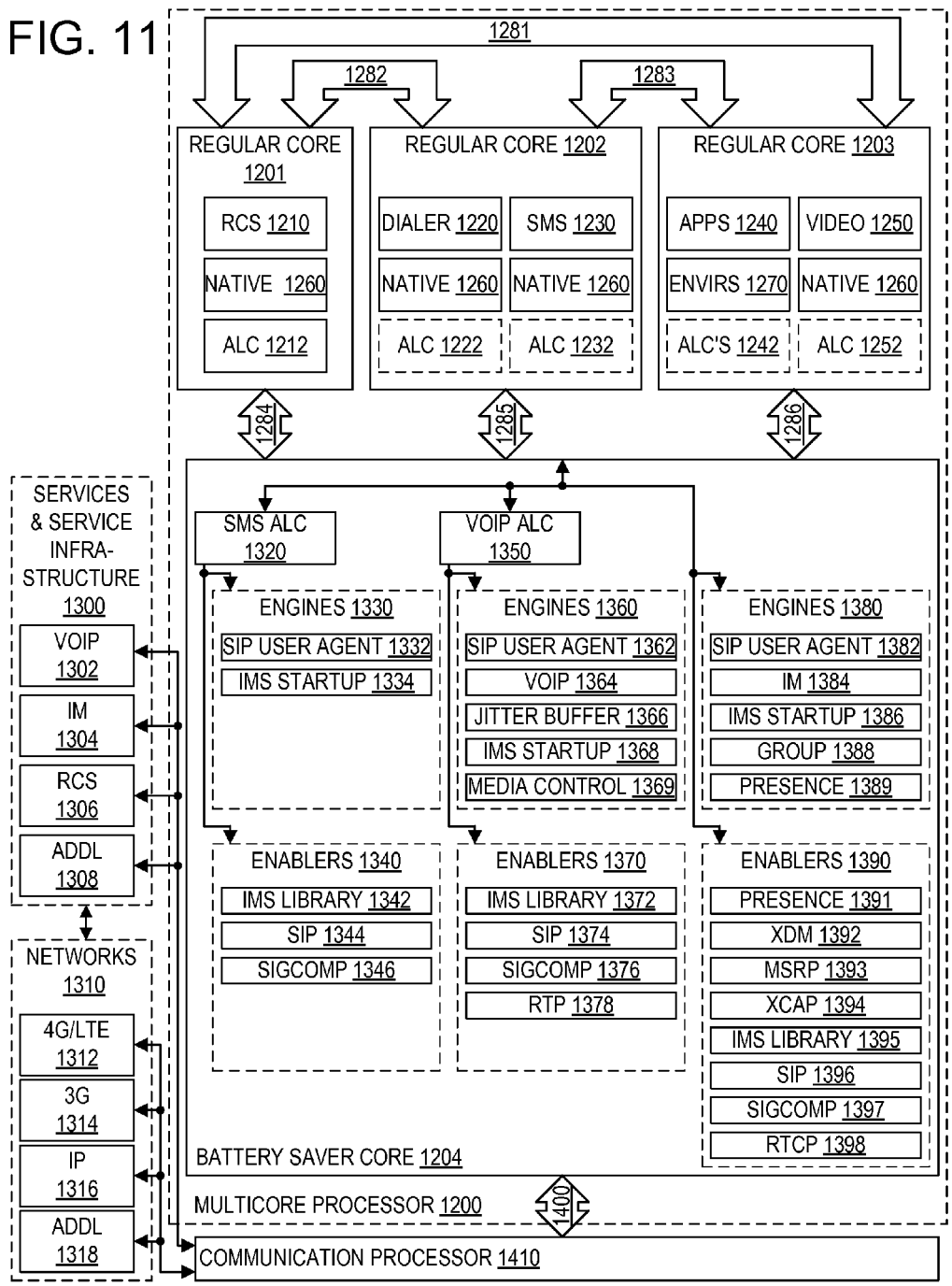
FIG. 11 is a schematic block diagram of an illustrative implementation of the distribution of FIG. 7 using a function call architecture.

FIG. 11 is a schematic block diagram of an implementation of the distribution shown in FIG. 7 on a multicore processor 1200 using call functions. Illustratively, RCS application 1210, native environment 1260, and RCS ALC 1212 are installed on regular core 1201 of the multicore processor 1200; dialer 1220, Dialer ALC 1222, SMS application 1230, SMS ALC 1232, and native environment 1260 are installed on regular core 1202 of the multicore processor 1200; and video application 1250, native environment 1260, Video ALC 1252, other applications 1240, other environments 1270, and other ALC's 1242 are installed on regular core 1203 of the multicore processor 1200.

Function calls are made to specific groups of engines 1330, 1360 and 1380, and enablers 1340, 1370 and 1390, and SMS ALC 1320 and VoIP ALC 1350 installed on battery saver core 1204 of the multicore processor 1200 through fast inter-core interfaces 1284, 1285 and 1286. Other multicore processor interfaces 1281, 1282 and 1283 are provided for direct communication between the regular cores 1201, 1202 and 1203. Such engines, enablers and ALC's may be embedded in the battery saver processor core 1204, if desired. The groups of engines 1330, 1360 and 1380, and enablers 1340, 1370 and 1390, and the SMS ALC 1320 and VoIP ALC 1350 generally correspond to the groups of engines 930, 960 and 980, and enablers 940, 970 and 990, and the SMS ALC 920 and the VoIP ALC 950 discussed with reference to FIG. 9.

Communications between the battery saver core 1204 and the communication processor 1410 are handled by interface 1400. The inter-core interface 1286 and the interface 1410 are presumed fast enough to handle the video transfer.

Regardless of the distribution of services chosen in accordance with the balancing of the factors, the modular nature of the real-time communications client architecture described herein also greatly facilitates software and firmware changes and updates, including upgrades to support additional services and/or enhancements to existing services and/or fix any issues from interoperability testing. In one approach, different frameworks for the same services are installed, and the framework put into use is selected in any suitable manner, illustratively by a configuration file. Low power and high power versions of the same framework may be provided in different cores or processors as appropriate, with one being selected as desired. A framework may be stored in one core and transferred to another core as needed using inter-core file transfer. Where a framework is selected but not yet installed on the device, the new framework may be downloaded to the device. If a configuration file is used, it may be set by the device manufacturer or by the carrier (where the device is a smartphone, for example) before delivery of the device to the user, or after delivery via a SMS configuration command or even by the operating system itself based on use monitoring and programmed decision-making. Applicable specification work is being done by the Open Mobile Alliance Ltd. of Newbury, Berkshire, UK.

The various embodiments of the invention described herein are illustrative of our invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention, as set forth in the following claims.

The invention claimed is:

1. A real-time communications client architecture for a mobile digital device having a plurality of processors disposed therein, comprising:
    a Session Initiation Protocol/Internet Protocol Multimedia Subsystem ("SIP/IMS") framework installed on a first one of the processors, the SIP/IMS framework having an interface; and
    a first framework for a real-time communications service installed on a second one of the processors other than the first processor, the first framework having an interface;
    the interfaces of the SIP/IMS framework and the first framework being coupled to one another for handling communications between the SIP/IMS framework and the first framework.

2. The real-time communications client architecture of claim 1 wherein the first processor is a communication processor.

3. The real-time communications client architecture of claim 2 wherein the second processor is an application processor.

4. The real-time communications client architecture of claim 3 wherein:
    the communication processor is a single core processor; and
    the application processor is a single core processor.

5. The real-time communications client architecture of claim 3 wherein:
    the communication processor is a single core processor; and
    the application processor is a multi-core processor.

6. The real-time communications client architecture of claim 3 wherein:
    the communication processor is a multi-core processor; and
    the application processor is a multi-core processor.

7. The real-time communications client architecture of claim 3 wherein:
    the communication processor is a multi-core processor; and
    the application processor is a single core processor.

8. The real-time communications client architecture of claim 1 wherein the first processor is an application processor.

9. The real-time communications client architecture of claim 8 wherein the second processor is a communication processor.

10. The real-time communications client architecture of claim 1 wherein:
    the interface of the SIP/IMS framework is an inter-processor interface; and
    the interface of the first framework is an inter-processor interface.

11. The real-time communications client architecture of claim 1, wherein the first processor comprises a battery saver core.

12. The real-time communications client architecture of claim 1, wherein the second processor comprises a battery saver core.

13. The real-time communications client architecture of claim 1, wherein the first framework is one of a Voice over Internet Protocol ("VoIP") framework, a video framework, a VoIP and video framework, a Rich Communications Services ("RCS") framework, and a Short Message Service ("SMS") over Internet Protocol Multimedia Subsystem ("IMS") framework.

14. The real-time communications client architecture of claim 1, further comprising:
    a second framework for a real-time communications service installed on one of the first processor and the second processor, the second framework having an interface;
    the interfaces of the SIP/IMS framework and the second framework being coupled to one another for handling communications between the SIP/IMS framework and the second framework.

15. The real-time communications client architecture of claim 14, wherein the interfaces of the SIP/IMS framework and the first framework are coupled to one another, and the interfaces of the SIP/IMS framework and the second framework are coupled to one another, for handling communications between the SIP/IMS framework and the first and second frameworks when active at the same time.

16. The real-time communications client architecture of claim 14, wherein:
    the first framework is one of a Voice over Internet Protocol ("VoIP") framework, a video framework, a VoIP and video framework, a Rich Communications Services ("RCS") framework, and a Short Message Service over Internet Protocol Multimedia Subsystem ("SMS over IMS") framework; and
    the second framework is one of a VoIP framework, a video framework, a VoIP and video framework, a RCS framework, and a SMS over IMS framework.

17. A real-time communications client architecture for a mobile digital device having a communication processor and an application processor, comprising:
    a Session Initiation Protocol/Internet Protocol Multimedia Subsystem ("SIP/IMS") framework installed on the communication processor, the communication processor having an inter-processor interface;
    a plurality of frameworks for respective real-time communications services comprising at least one of a Voice over Internet Protocol ("VoIP") framework, a video framework, a VoIP and video framework, a Rich Communications Services ("RCS") framework, and a Short Message Service ("SMS") over Internet Protocol Multimedia Subsystem ("IMS") framework installed on the application processor, the application processor having an inter-processor interface;
    the inter-processor interfaces of the communication processor and the application processor being coupled to one another for handling communications between the SIP/IMS framework and the real-time communications services frameworks.

18. The real-time communications client architecture of claim 17 further comprising a Voice over Internet Protocol ("VoIP") framework installed on the communication processor.

19. The real-time communications client architecture of claim 17 further comprising a Short Message Service over Internet Protocol Multimedia Subsystem ("SMS over IMS") framework installed on the communication processor.

20. The real-time communications client architecture of claim 17 further comprising a Voice over Internet Protocol ("VoIP") framework and a Short Message Service over Internet Protocol Multimedia Subsystem ("SMS over IMS") framework installed on the communication processor.

21. The real-time communications client architecture of claim 17 further comprising a Voice over Internet Protocol ("Vol P") framework, a video framework, and a Short Message Service over Internet Protocol Multimedia Subsystem ("SMS over IMS") framework installed on the communication processor.

22. The real-time communications client architecture of claim 17 further comprising a Voice over Internet Protocol ("Vol P") and video framework, and a Short Message Service over Internet Protocol Multimedia Subsystem ("SMS over IMS") framework installed on the communication processor.

* * * * *